United States Patent Office 3,631,214
Patented Dec. 28, 1971

---

3,631,214
RECOVERY OF AROMATIC HYDROCARBONS
Robert M. Engelbrecht, deceased, late of St. Louis, Mo., by Alice M. Engelbrecht, executrix, St. Louis, James C. Hill, Chesterfield, and Richard N. Moore, St. Louis, Mo., assignors to Monsanto Company, St. Louis, Mo.
No Drawing. Filed June 29, 1970, Ser. No. 50,887
Int. Cl. C07c 15/10
U.S. Cl. 260—669                10 Claims

ABSTRACT OF THE DISCLOSURE

A process for recovering aromatic hydrocarbons from styrene tar residues by thermally hydrocracking such residues.

BACKGROUND OF THE INVENTION.

This invention relates to a method of recovering valuable aromatic hydrocarbons from the distillation residue of a styrene purification system. More particularly, it relates to the recovery of benzene, styrene, naphthalene and alkyl benzenes from such distillation residues.

It is well known that in the manufacture of styrene from ethylbenzene by the steps of dehydrogenating the ethylbenzene and separating the styrene from unreacted benzenes by distillation, millions of pounds of distillation residues are produced annually as by-products for which no uses other than as fuel has been found. These residues are gross mixtures having broad distillation ranges and generally distilling above 150° C. They are usually made up of residues from the purification of ethylbenzene and the residues from the purification of styrene but because the ethylbenzene residue is frequently used as an additive in the styrene purification system, the residue is collected as one mixture from the styrene distillation columns. For the purposes of the application, styrene distillation residues will be defined as the bottoms fraction from the last column in a distillation train wherein a reaction mixture obtained from the dehydrogenation of ethylbenzene containing styrene monomer, ethylbenzene, benzene and minor amounts of aromatic by-products is distilled with benzene, ethylbenzene and styrene being recovered, respectively. This mixture, although quite variable in composition, generally contains polyethylbenzenes, a styrene-sulfur reaction product, and polystyrene in major proportions and free sulfur, styrene monomer and, other aromatic compounds in minor proportions.

Because of the presence of the sulfur in the mixture, the demand for the residue as a fuel is very limited, and for this reason, the distillation residues have heretofore had little or no economic value. Furthermore, since there is an ever-increasing demand for styrene and the chief source for such styrene is the dehydrogenation of ethylbenzene, any method with practical economics for converting such residues to valuable components, consisting in large part of ethylbenzene, would represent a distinct improvement in the economics of styrene production. It is to this problem that the present invention is directed.

SUMMARY

It is an object of the present invention to provide a method for the recovery of valuable aromatic hydrocarbons from styrene distillation residues. A further object of this invention is to convert the polyethylbenzene present to ethylbenzene and other aromatic hydrocarbons and to recover useful amounts of ethylbenzene and such aromatic hydrocarbons from the styrene residues. Another object is to convert the styrene polymer to styrene monomer and aromatic hydrocarbons and recover these compounds. A still further object is to recover for further use the sulfur values from the styrene residues. These and other objects of the invention will become apparent from the following description.

The present invention in one of its embodiments is a process comprising thermally hydrocracking styrene distillation residues in the presence of 1 to 10 moles of hydrogen per mole of styrene monomer equivalent of said residue in a thermal hydrocracking zone maintained at temperatures of from about 900° F. to 1400° F. and pressures of from about 100 to 2000 p.s.i.g. or as high as engineering principles and construction costs permit, withdrawing the effluent from said hydrocracking zone, and separating and recovering the aromatic hydrocarbons thus produced.

DESCRIPTION OF THE PREFERRED EMBODIMENTS

In order to demonstrate the present invention as well as to describe its operation, the following example is presented.

Example I

Several runs were made for the hydrocracking of styrene distillation residues. The styrene distillation residues contained approximately 33% styrene monomer and polymer, 42% of "flux oil," ethylbenzene distillation column bottoms charged to the pot section of the styrene distillation column, 13% of higher boiling hydrocarbons, and 12% total sulfur. However, the feed contained only 3.2% sulfur after decanting from precipitated elemental sulfur. In each run a stream composed of 0.10 gram (1 millimole of styrene equivalent) of styrene distillation residues mixed with 7 millimoles of hydrogen per minute was pumped through a thermal reactor. The thermal reactor of 10 milliliters gross volume containing a bed of one-eighth inch heat exchange pebbles was maintained at a pressure of 700 p.s.i.g. at several different temperatures. Since the net reactor volume effective was approximately 5 mls., the effective residence time of the reactants in the thermal reactor was about 20 seconds. The effluent from the reactor was passed through a water cooled condenser and the liquid product recovered. This liquid product was then analyzed by gas liquid chromatography using an internal standard and the amounts of each product determined. From this data the conversion and yield of the various products was determined. The following Table I shows the temperature in each run and the conversions and yields obtained at the various temperatures. Conversion is defined as that percentage of the styrene distillation residue charged to the reactor and converted to one of the liquid aromatic hydrocarbon products. The yield is expressed as a percentage of each aromatic hydrocarbon converted, assuming conversion to the same pattern by recycle of heavy ends to extinction.

TABLE I

| | Reaction temperature, °F. | | | | | | | | | | | |
|---|---|---|---|---|---|---|---|---|---|---|---|---|
| | 1050 | | 1100 | | 1150 | | 1200 | | 1250 | | 1300 | |
| | Conv. | Yield | Conv. | Yield | Conv. | Yield | Conv. | Yield | Conv. | Yield | Conv. | Yield |
| Gas | 14.0 | 27.2 | 14.7 | 26.6 | 13.7 | 22.2 | 16.6 | 25.1 | 24.2 | 31.3 | 31.8 | 36.9 |
| Benzene | 1.4 | 2.7 | 1.9 | 3.4 | 4.3 | 6.9 | 7.5 | 11.4 | 16.2 | 21.0 | 26.4 | 30.7 |
| Toluene | 7.5 | 14.5 | 8.4 | 15.1 | 10.5 | 17.0 | 12.1 | 18.2 | 13.8 | 17.9 | 13.5 | 15.7 |
| Ethylbenzene | 20.0 | 38.8 | 22.6 | 40.9 | 25.8 | 41.9 | 24.9 | 37.6 | 17.5 | 22.6 | 7.8 | 9.0 |
| Styrene | 3.9 | 7.5 | 2.1 | 3.9 | 1.2 | 2.0 | 0.7 | 1.1 | 0.5 | 0.7 | 0.3 | 0.3 |
| Cumene | 3.5 | 6.9 | 3.8 | 6.8 | 3.5 | 5.7 | 1.9 | 2.8 | 0.6 | 0.8 | | |
| Naphthalene | 1.3 | 2.5 | 1.9 | 3.4 | 2.7 | 4.3 | 2.6 | 4.0 | 4.4 | 5.7 | 6.4 | 7.4 |
| Heavy ends | 48.5 | | 44.6 | | 38.3 | | 33.7 | | 22.7 | | 13.9 | |

The liquid aromatic hydrocarbons boiling up to 153° C. contained only from 0.05 to 0.09% sulfur while the higher boiling liquids produced contained from 0.15 to 0.20% sulfur.

A run similar to those above made at a temperature of 1200° F. employing a waste hydrogen stream instead of pure hydrogen shows that such source of hydrogen is quite suitable for the thermal hydrocracking step since the same overall conversion is obtained with very little difference in conversion as between the various products of the hydrocracking realized at the same temperature with pure hydrogen added. The waste hydrogen stream, which is normally burned as fuel, is produced in the dehydrogenation of ethylbenzene to styrene and has a composition of 88 mole percent hydrogen, 10 mole percent carbon dioxide, 1 mole percent methane and light hydrocarbons and 1 mole percent aromatic hydrocarbons.

The styrene distillation residues suitable for use in the present invention include all bottoms fractions from the last column in a styrene distillation train wherein a reaction mixture obtained from the dehydrogenation of ethylbenzene is distilled. Such bottoms fractions are mixtures of widely variable composition. A typical composition of such styrene distillation residues is the following:

| | Percent |
|---|---|
| Styrene polymer and monomer | 20 to 45 |
| Flux oil (ethylbenzene bottoms) | 30 to 50 |
| High boilers (boiling about 225° C.) | 10 to 25 |
| Sulfur | 5 to 15 |

The thermal hydrocracking of the present invention may be carried out over various conditions of temperature and pressure. Generally, the temperature will be within the range of about 900° to about 1400° F. with temperatures of from about 1050° to 1300° F. preferred. The pressure can range from atmospheric to 5000 p.s.i.g. or as high as engineering principles and construction costs permit. However, for reasons of economy in equipment costs the pressure ordinarily will be within the range of 100 to 2000 p.s.i.g. Preferably the pressure will be within the range of from 300 to 900 p.s.i.g.

The styrene distillation residues are of varying and complex composition as described above, and hence have no fixed or known molecular weight. However, for the purposes of this application the molecular weight of monomeric styrene, 104, has been assumed for the residues in order to determine the moles of hydrogen to be employed in the reaction. Thus, throughout this application the moles of hydrogen will be related to the moles of styrene monomer equivalent of such residues. The hydrogen in the hydrocracking zone should be present in amounts of from 1 to 10 moles per mole of styrene monomer equivalent of styrene residue charged to the hydrocracking zone. Amounts of from 2 to 8 moles of hydrogen per mole of styrene monomer equivalent of the residue are preferred. This hydrogen may be mixed with the distillation residues before charging to the hydrocracking zone or it may be added separately to the zone.

In carrying out the present invention, the residence time of the reactants in the reaction zone will generally vary from about 1 to 40 seconds. However, it is preferred that the residence time be within the range of about 5 to 25 seconds.

The equipment which may be used in carrying out the present invention is not critical and any conventional thermal hydrocracking equipment may be used. It is only necessary that the equipment be such as to withstand the pressures and temperatures of the reactions and that the equipment follow good engineering principles.

The condensed liquid aromatic product containing benzene, toluene, ethylbenzene, styrene, cumene and naphthalene is easily separated from the gaseous products of the reaction containing hydrogen, hydrogen sulfide, carbon dioxide, carbon monoxide, methane and other light hydrocarbons. The aromatic hydrocarbons in the liquid product can be separated by ordinary fractional distillation. However, it is preferred in the present process that this aromatic liquid product be recycled with the normal dehydrogenation effluent in a conventional styrene plant. Consequently, in its preferred embodiment, no separate distillation facilities for the aromatic product are required. This fact makes this preferred embodiment much more economical in the installation of the present invention since lower capital expenditures are involved.

An additional important advantage of the present process is the fact that it can employ styrene distillation residues containing more than 12% sulfur and this sulfur in large part can be recovered. The residues can be separated from precipitated elemental sulfur and the thus recovered sulfur available for separate use, with the combined sulfur entering the hydrocracking process converted to hydrogen sulfide and recovered by conventional methods. However, this is not essential in the operation of the process. The process of the present invention can tolerate high percentages of sulfur contaminants in the residues employed as feed stock. Virtually all the sulfur present in the feed is converted to hydrogen sulfide in the gaseous product stream from which the sulfur can be recovered by known techniques and equipment.

Furthermore, as shown in the above example, quite impure hydrogen streams can be employed in the thermal hydrogenation with no loss in efficiency or pattern of aromatic liquid products realized. This fact also makes for very economical operation of the present invention in a petrochemical refining operation where such crude hydrogen containing streams are available.

What is claimed is:

1. A process for the recovery of aromatic hydrocarbons from styrene distillation residues which comprises hydrocracking said residues in the presence of from 1 to 10 moles of hydrogen per mole of styrene monomer equivalent of said residues in a thermal hydrocracking zone maintained at temperatures of from about 900° to 1400° F. and pressures of from about 100 to 2000 p.s.i.g., withdrawing the effluent from said hydrocracking zone, and recovering the liquid aromatic hydrocarbons by condensation.

2. The process of claim 1 wherein the residence time of the reactants in said hydrocracking zone is from about 1 to 40 seconds.

3. The process of claim 2 wherein the hydrocracking zone is maintained at temperatures of from about 1050° to 1300° F.

4. The process of claim 1 wherein there are present from about 2 to 8 moles of hydrogen per mole of styrene monomer equivalent of said distillation residues.

5. The process of claim 1 wherein said hydrogen is part of a crude or waste hydrogen stream.

6. The process of claim 1 wherein the liquid aromatic hydrocarbons recovered are recycled to a zone wherein the dehydrogenation of ethylbenzene is carried out.

7. The process of claim 4 wherein said hydrocracking zone is maintained at temperatures of from about 1050° to 1300° F. and wherein the residence time in said hydrocracking zone is from about five to twenty-five seconds.

8. The process of claim 7 wherein said hydrogen is part of a crude or waste hydrogen stream.

9. The process of claim 7 wherein the liquid aromatic hydrocarbons recovered are recycled to a zone wherein the dehydrogenation of ethylbenzene is carried out.

10. The process of claim 1 wherein the styrene distillation residues contain up to 12% by weight of sulfur.

References Cited
UNITED STATES PATENTS

| | | | |
|---|---|---|---|
| 2,813,916 | 11/1957 | Boston | 260—669 |
| 2,905,629 | 9/1959 | Smith et al. | 260—669 |
| 3,515,647 | 6/1970 | Van Tassell et al. | 260—669 |

CURTIS R. DAVIS, Primary Examiner

U.S. Cl. X.R.

208—112; 260—672